May 30, 1961 E. B. BYAM 2,985,897
TRANSFER MECHANISM FOR PROGRESSIVE HEADERS
Filed July 30, 1957 4 Sheets-Sheet 1

INVENTOR
Erwin B. Byam
BY
Rockwell, Barthstow
ATTORNEYS

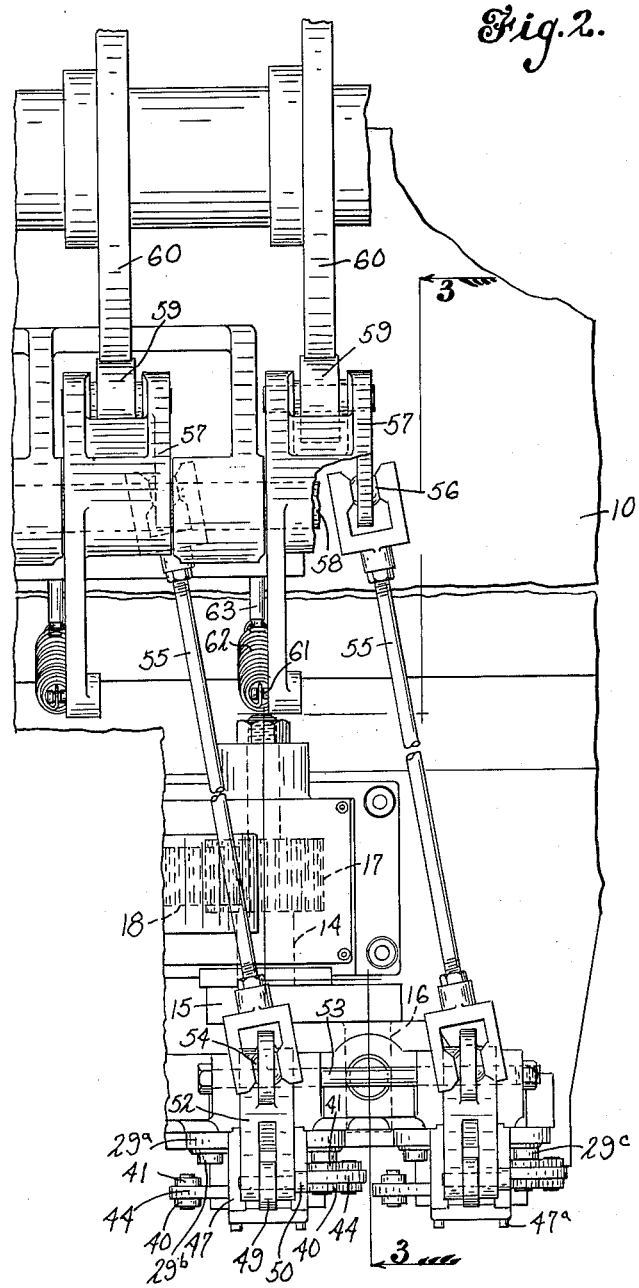

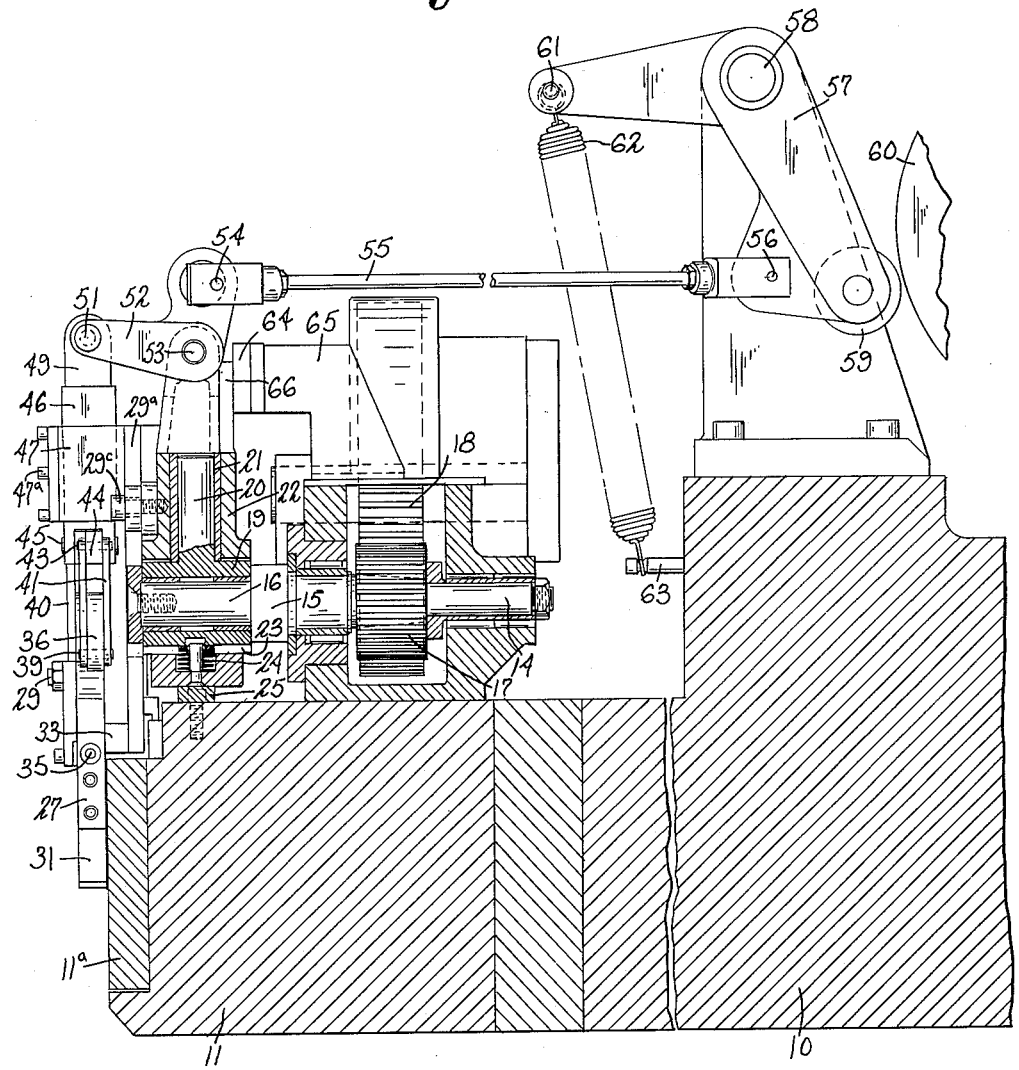

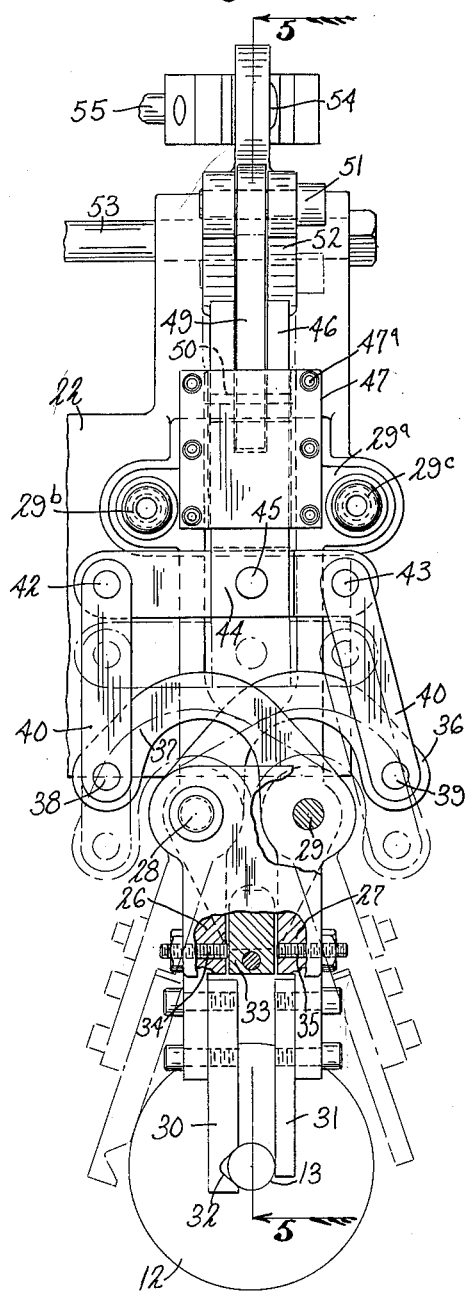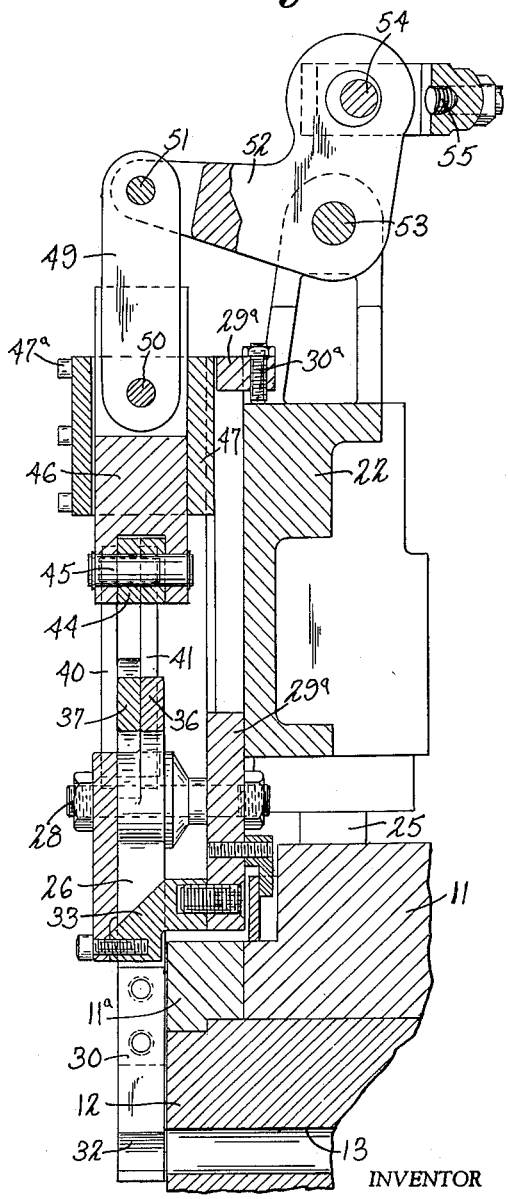

United States Patent Office 2,985,897
Patented May 30, 1961

2,985,897
TRANSFER MECHANISM FOR PROGRESSIVE HEADERS

Erwin B. Byam, Wolcott, Conn., assignor, by mesne assignments, to Textron Inc., Providence, R.I., a corporation of Rhode Island Filed July 30, 1957, Ser. No. 675,065

6 Claims. (Cl. 10—12)

This invention relates to metal-working machines such as progressive headers, nut formers or the like, and particularly to transfer mechanism for such devices.

In machines of this character, where a blank is operated on progressively at a number of stations in the same machine, means are provided for transferring the blank from one station to the next. This function is usually performed by so-called transfer fingers, these fingers being arranged to receive and grip a blank when it is pushed out of one die and are then moved to position opposite the next succeeding die or work station where the blank will be pushed out of the transfer fingers to be operated upon at the station to which it has been transferred. The present invention relates to the construction and operation of the transfer mechanism and particularly to the control of the gripping fingers in their movements to grip and release the blanks at the proper time.

The device shown in the present application is similar in many respects to that shown in the patent to Hoyt et al. No. 2,791,786 granted May 14, 1957. However, in that patent the gripping fingers were controlled by means of a wedge member entering between the shanks of the finger holders to separate them, this wedge member being actuated by a cam mechanism on the machine. The fingers were brought together into gripping position by means of springs acting on the fingers themselves.

The present invention represents an improvement in some respects over that shown in the prior patent referred to in that in the present structure the cam-actuated mechanism is directly connected to the fingers themselves so that they will be positively moved toward and from their gripping positions. To this end the cam-actuated mechanism is linked directly to the finger holders and a cam actuates this mechanism to move the fingers to open position. A tension spring serves to maintain the cam follower on the cam-actuated mechanism against the cam itself so that this spring serves to move the fingers toward their gripping positions. In this manner the relatively heavy springs acting on the finger holders themselves may be omitted and the spring which maintains the cam follower against the cam will also perform the work of positively moving the fingers to gripping position.

As illustrated, the finger holders, which carry the gripping fingers, are mounted upon a carrier mechanism which is moved in a direction to carry the fingers across the face of the dies, and on this carrier a slide is mounted to reciprocate in a vertical direction to which slide is pivotally connected a balance bar or evener. Links pivoted to the ends of this balance bar are also pivoted to extensions or shanks formed as a part of the finger holders. With this construction when the slide is actuated by the cam mechanism, the fingers will be positively moved to open and closed positions.

One object of the invention is the provision of new and improved transfer mechanism for a metal-working machine such as a progressive header or the like.

A further object of the invention is to provide improved mechanism for controlling the gripping fingers of the transfer mechanism in a machine of the character described.

Still another object of the invention is to provide a transfer mechanism of the character described having improved means for controlling the position of the gripping fingers of the mechanism whereby the gripping fingers will be positively actuated in an expedient manner and by mechanism which will resist the wear and tear to which it may be subjected.

Still another object of the invention is to provide finger-controlling means for a transfer mechanism of the character described wherein the fingers may be readily adjusted to occupy a position registering with the die and where one of the gripping fingers may move independently to some extent of the other so that one may be made the master finger in the gripping of a blank.

To these and other ends the invention consists in the novel features and combinations of parts to be hereinafter described and claimed.

In the accompanying drawings:

Fig. 2 is a top plan view of a portion of the device shown in Fig. 1;

Fig. 3 is a sectional view on line 3—3 of Fig. 2;

Fig. 4 is an enlarged front elevational view of one of the finger mechanisms; and Fig. 5 is a sectional view on line 5—5 of Fig. 4.

Figure 1:
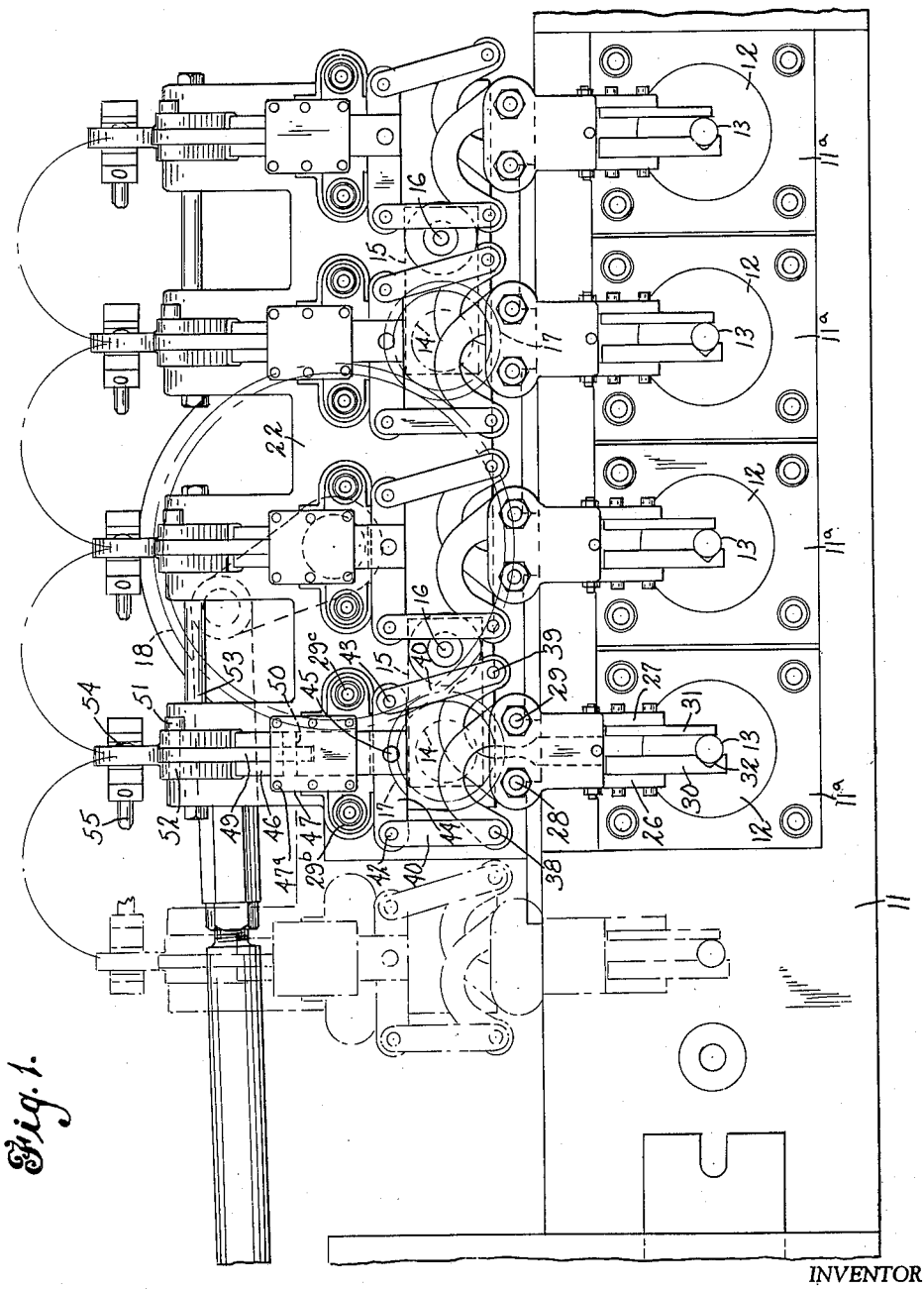
Fig. 1 is a front elevational view of a portion of a progressive header having a transfer mechanism embodying my improvements.

To illustrate one embodiment of my invention I have shown in the drawings a transfer mechanism having a frame 10 and a die block 11 in the face of which are secured a plurality of dies 12 by die caps 11ᵃ, the dies having die openings 13 therein. Mounted on the frame, as shown in Fig. 2, is a crank shaft 14 having a crank 15 carrying a crank pin 16. Upon the shaft 14 is mounted a pinion 17, the teeth of which are in mesh with a gear 18 so that upon oscillation of the gear 18 the crank 15 will be oscillated. The gear 18 may be oscillated by any suitable mechanism such as that shown in the patent to Hoyt et al. No. 2,791,786, previously referred to.

Rotatably carried upon the crank pin 16 is a bushing or block 19 having an upward extension 20 fitted in an opening 21 in a finger carrier 22. The carrier 22 is provided with an opening to receive the block 19 in which opening the block has slight play, as shown at 23, this play being taken up by the spring 24. A stop block 25 is mounted on the frame 10 to limit the movement of the carrier toward the frame.

As illustrated, the carrier supports four sets of transfer fingers which are moved between successive stations to transfer the work from one station to the next and, as is well known in the art, upon oscillation of the crank 15, the carrier will be moved transversely of the machine in opposite directions so as to move the fingers across the face of the dies. As the finger mechanisms are alike, a description of one thereof will suffice for all.

As shown more especially in Figs. 1 and 4, a pair of finger holders 26 and 27 are pivoted at 28 and 29 respectively to a plate 29ᵃ. This plate is adjustably secured to the face of the carrier 22 by screws 29ᵇ and 29ᶜ (Figs. 4 and 5) which pass through oversized openings in the plate to permit adjustment of the latter on the carrier. The plate is held in adjusted position by adjusting screw 30ᵃ passed through a lug on the plate 29ᵃ. Upon the lower ends of the finger holders 26 and 27 are the gripping fingers 30 and 31, the finger 30 being provided with a V-shaped notch 32 to engage the blank or workpiece. Between these fingers a block or stop member 33 is secured to the carrier and an adjusting screw 34 is carried by the finger 26 to adjust the closed position of the finger 30 so that the notch 32 will correctly register with the die opening 13. A similar adjusting screw 35 is provided in the holder 27. This screw, however, may be so adjusted that it will only strike the stop member 33 when the fingers are empty so that it will not hold the finger 31 away from a blank if one is to be gripped between the fingers.

Above their pivot points the finger holders 26 and 27 are provided with extensions or shanks 36 and 37 respectively, these shanks being formed integrally with the fingers or rigidly secured thereto and, as shown, are of arcuate shape so that they will serve to swing the fingers to open position when moved downwardly, as shown in Fig. 4, and they also lie in different planes, as shown in Fig. 5, so that they will not interfere with each other in operation.

Pivoted at 38 and 39 to the end of each of the extensions 36 and 37 are the lower ends of a pair of links 40 and 41, the upper ends of these links being pivoted at 42 and 43 to a balance bar or evener 44.

The balance bar 44 is pivoted intermediate its ends at 45 within the bifurcated lower end of a slide member 46 (Fig. 5) slidably mounted in a guide bracket 47 secured to the plate 29ᵃ by screws 47ᵃ which pass through the side walls of the bracket into the plate. It will be noted that the pivot point 45 is closer to one end of the balance bar 44 than it is to the other so that the actuation of the slide member 46 will have a differential effect upon the operation of the fingers as will be referred to hereinafter.

As shown more especially in Figs. 3 and 5, the slide member 46 projects upwardly through the guide bracket 47 and a link 49 is pivoted to the slide member at its lower end as at 50, and the upper end of this link is pivoted at 51 to one arm of a bell crank lever 52 pivoted at 53 to the carrier. To the other arm of this bell crank lever is swiveled at 54 a rod 55. The rear end of this rod 55 is swiveled at 56 (Figs. 2 and 3) to one arm of a lever 57 pivoted on the frame at 58. The lever 57 carries a cam follower roller 59 adapted to be engaged by the periphery of a cam 60 operated in a well-known manner by the mechanism of the header.

To the other arm of the lever 57 is secured at 61 one end of a tension spring 62 and the other end of this spring is secured to a pin 63 carried by the frame of the machine. With this construction it will be seen that the spring 62 not only tends to urge the cam follower 59 toward the periphery of the cam 60, but also through the lever 52 tends to move the slide member 46 upwardly, which, through the mechanism shown particularly in Fig. 4, moves the fingers toward each other to a position to grip a blank. The cam 60 will engage the follower 59 to move the lever 57 in the opposite direction so as to move the slide 46 downwardly and open the fingers by means of the links 40 and 41.

It will be seen that as the spring 62 urges the rod 55 toward the right, as shown in Fig. 3, it would tend to exert a pull on the carrier 22 in this direction which might tend to tilt the carrier upon the crank pin 16. A wear plate 64 is provided upon a bracket 65 on the frame and an upstanding part 66 on the carrier engages this bracket so as to take the pull of the spring upon the pivot 53 of the lever 52.

With the above construction it will be apparent that when the cam 60 acts upon the roller 59, the lever 55 will be moved toward the left, as shown in Figs. 3 and 5, and thus push the slide 46 downwardly. This moves the balance bar downwardly and also the pivots 38 and 39 of the links 40 with the finger extensions 36 and 37 to the dotted-line position shown in Fig. 4 which opens the fingers 30 and 31 to release a blank. When the cam is withdrawn from the roller 59, the spring 62 urges the lever 57 in a counterclockwise direction about its pivot 58 and moves the rod 55 to the right, thus raising the slide 46, the balance bar 44 and the links 40. This moves the finger bar extensions 36 and 37 to their full-line positions shown in Fig. 4 which closes the fingers as permitted by the adjusting screws 34 and 35.

The roller 59 is out of engagement with the cam 60 at this time so that the adjusting screw 34 is moved against the stop 33 to cause the notch 32 in the finger 30 to register with the die opening 13. Due to the fact that the pivot 45 of the slide member with the balance bar 44 is closer to the pivot 43 than to the pivot 42, the finger 30 becomes the master finger and will be moved to position to grip the blank. Thereafter, the finger 31 will move down against the blank and, as stated, at this time the adjusting screw 35 will be out of engagement with the stop 33 so as not to prevent contact of the finger 31 with the blank.

When the fingers are being opened, all of the pressure of the spring 62 is borne by the cam 60 so that there is no spring pressure on the fingers themselves to resist their opening movement.

While I have shown and described one embodiment of my invention, it will be understood that it is not to be limited to all of the details shown, but is capable of modification and variation within the spirit of the invention and within the scope of the claims.

What I claim is:

1. A header or like mechanism comprising a frame, a die bed carried by the frame having a plurality of dies in its face, means for transferring a blank from one die to the next comprising a carrier movable with respect to the dies, a pair of cooperating blank-gripping fingers pivotally supported by the carrier and moved thereby across the face of the die bed, a member movably mounted on the carrier, links each pivotally connected to said member and connected to said fingers to effect both separating and approaching movements thereof upon movement of said member in opposite directions, cam-actuated means on the frame connected to said member to actuate the latter, and the connections of said links to said member being at unequal distances from the connection of the cam-actuated means with said member as to apply greater force to one finger than to the other.

2. A header or like mechanism comprising a frame, a die bed carried by the frame having a plurality of dies in its face, means for transferring a blank from one die to the next comprising a carrier movable with respect to the dies, a pair of cooperating blank-gripping fingers pivotally supported by the carrier and moved thereby across the face of the die bed, a member mounted on the carrier for reciprocatory movement, a link pivoted to said member adjacent each end of the latter and pivotally connected to one of said fingers, and cam-actuated means pivotally connected to said member at an intermediate point of the latter to move the latter, said pivotal connection being closer to one end of said member than to the other, and stop means on the carrier which said fingers engage when moved to closed position.

3. A header or like mechanism comprising a frame, a die bed carried by the frame having a plurality of dies in its face, means for transferring a blank from one die to the next comprising a carrier movable with respect to the dies, a pair of cooperating blank-gripping fingers pivotally supported by the carrier and moved thereby across the face of the die bed, a member mounted on the carrier for reciprocatory movement, a link pivoted to said member adjacent each end of the latter and pivotally connected to one of said fingers, a slide element slidably mounted on the carrier and pivotally connected to said member at a point unequally distant from the connection of said links thereto, cam-actuated means on the frame to actuate said slide, and stop means on the carrier which said fingers engage when moved to closed position.

4. A header or like mechanism comprising a frame, a die bed carried by the frame having a plurality of dies in its face, means for transferring a blank from one die to the next comprising a carrier movable with respect to the dies, a pair of cooperating blank-gripping fingers pivotally supported by the carrier and moved thereby across the face of the die bed, a member mounted on the carrier for reciprocatory movement, a link pivoted to said member adjacent each end of the latter and pivotally connected to one of said fingers, a slide element slidably mounted on the carrier and pivotally connected to said member at a point unequally distant from the connection of said links thereto, cam-actuated means on the frame, a link connecting said cam-actuated means to said slide element, and a spring acting upon said link to urge it in one direction, and stop means on the carrier which said fingers engage when moved to closed position.

5. A header or like mechanism comprising a frame, a die bed carried by the frame having a plurality of dies in its face, means for transferring a blank from one die to the next comprising a carrier movable with respect to the dies, a pair of cooperating blank-gripping fingers pivotally supported by the carrier and moved thereby across the face of the die bed, a balance bar movably supported on the carrier, a link pivoted to each of the fingers and pivoted to said balance bar, a slide element on the carrier pivoted to said balance bar at a point between the pivots of said links thereto, cam means for actuating said slide element in one direction, and a spring actuating said element in the other direction.

6. A header or like mechanism comprising a frame, a die bed carried by the frame having a plurality of dies in its face, means for transferring a blank from one die to the next comprising a carrier movable with respect to the dies, a pair of cooperating blank-gripping fingers pivotally supported by the carrier and moved thereby across the face of the die bed, a balance bar movably supported on the carrier, a link pivoted to each of the fingers and pivoted to said balance bar, a slide element on the carrier pivoted to said balance bar at a point between the pivots of said links thereto, a lever pivotally mounted on the carrier and connected to said slide element, a second lever mounted on the frame and connected to said first lever, a cam element rotatably mounted on the frame, a follower on said second lever which said cam engages to actuate the slide element in a direction to open said fingers, and a spring acting on the second lever to maintain the follower in engagement with said cam and actuate said first lever in the opposite direction to actuate the fingers to gripping position.

References Cited in the file of this patent

UNITED STATES PATENTS

| | | |
|---|---|---|
| 2,187,266 | Carris | Jan. 16, 1940 |
| 2,272,592 | Wilcox | Feb. 10, 1942 |
| 2,382,227 | Hopkins | Aug. 14, 1945 |
| 2,589,475 | Carlsen | Mar. 18, 1952 |
| 2,791,786 | Hoyt | May 14, 1957 |

FOREIGN PATENTS

| | | |
|---|---|---|
| 21,989 | Sweden | Feb. 16, 1907 |